(12) United States Patent
Bi

(10) Patent No.: US 9,928,289 B2
(45) Date of Patent: Mar. 27, 2018

(54) METHOD FOR STORING XML DATA INTO RELATIONAL DATABASE

(71) Applicant: BORQS WIRELESS LTD., Beijing (CN)

(72) Inventor: Song Bi, Beijing (CN)

(73) Assignee: BORQS WIRELESS LTD., Beijing (CN)

( * ) Notice: Subject to any disclaimer, the term of this patent is extended or adjusted under 35 U.S.C. 154(b) by 519 days.

(21) Appl. No.: 14/385,184

(22) PCT Filed: Nov. 2, 2012

(86) PCT No.: PCT/CN2012/083947
§ 371 (c)(1),
(2) Date: Sep. 15, 2014

(87) PCT Pub. No.: WO2013/135055
PCT Pub. Date: Sep. 19, 2013

(65) Prior Publication Data
US 2015/0046455 A1    Feb. 12, 2015

(30) Foreign Application Priority Data
Mar. 15, 2012  (CN) .......................... 2012 1 0067768

(51) Int. Cl.
*G06F 7/00*   (2006.01)
*G06F 17/30*  (2006.01)

(52) U.S. Cl.
CPC .. *G06F 17/30598* (2013.01); *G06F 17/30917* (2013.01)

(58) Field of Classification Search
CPC .................. G06F 17/30598; G06F 17/30917
USPC ......................................................... 707/737
See application file for complete search history.

(56) References Cited

U.S. PATENT DOCUMENTS

| | | | |
|---|---|---|---|
| 2004/0088320 A1* | 5/2004 | Perry | G06F 17/30917 |
| 2005/0138052 A1* | 6/2005 | Zhou | G06F 17/30595 |
| 2006/0085451 A1* | 4/2006 | Pal | G06F 17/30917 |
| 2006/0101073 A1* | 5/2006 | Popa | G06F 17/30914 |
| 2007/0143321 A1* | 6/2007 | Meliksetian | G06F 17/30917 |
| 2007/0234202 A1* | 10/2007 | Lyness | G06F 3/0482 |
| | | | 715/234 |

FOREIGN PATENT DOCUMENTS

| | | |
|---|---|---|
| CN | 1687927 A | 10/2005 |
| CN | 101000622 A | 7/2007 |
| CN | 102662997 A | 9/2012 |

* cited by examiner

*Primary Examiner* — Kris Mackes
*Assistant Examiner* — Lin Lin Htay
(74) *Attorney, Agent, or Firm* — Christensen, Fonder, Dardi & Herbert PLLC

(57) ABSTRACT

A method for storing XML data into a relational database, including the following steps: splitting an XML Schema into one or more mapping configuration files, each mapping configuration file corresponding to a relational database table; parsing an XML text, and according to the associative relationship in the mapping configuration files, inserting the data in the XML text into the multiple relational database tables; and accessing the database to read the data in the XML text. The method stores XML file data into a relational database, and accelerates data reading and access speed.

4 Claims, 2 Drawing Sheets

METHOD FOR STORING XML DATA INTO RELATIONAL DATABASE

PRIORITY CLAIM

The present application is a National Phase entry of PCT Application No. PCT/CN2012/083947, filed Nov. 2, 2012, which claims priority to Chinese Patent Application No. 201210067768.1, filed Mar. 15, 2012, the disclosures of which are hereby incorporated by reference herein in their entirety.

FIELD OF THE INVENTION

The present invention relates to a data storage method, in particular to a method for storing XML data.

BACKGROUND OF THE INVENTION

XML is a descriptive markup language, and, like HTML, is an application of SGML (Standard Generic Markup Language, ISO-8879 international standard). The application scope of XML has gone beyond the scope reached by HTML, owing to the outstanding advantages of XML in terms of extensibility, portability, and well-formedness, etc.

An XML document consists of tags and content. There are six kinds of tags in XML: elements, attributes, entity references, comments, processing instructions, and CDATA sections. The most remarkable difference between XML and HTML is that document Type Declarations (DTDs) have been introduced into XML documents. DTDs enable a document to exchange Meta information related with its content with a parser. The emergence of DTDs endows extensibility, well-formedness, and verifiability to an XML document, so that XML obtains some properties similar to databases, and information can be organized and managed in XML; in addition, XML documents can be presented conveniently in web browsers in a way similar to HTML webpages, and can be transmitted and exchanged efficiently over Internet.

At present, XML documents can be processed mainly in two ways: SAX and DOM. SAX (Simple API for XML) is a stream-based event handling interface. SAX 2.0 was released in May 2000, in which many functions were enhanced, including support for name space. DOM (Document Object Model) is to build up a complete tree structure in the memory after an XML document is analyzed, and then carry out various operations on that basis. In simple comparison, SAX has a lower demand for system resources and is quicker than DOM, but it manipulates documents in a Read Only mode; DOM has a stronger processing capability, but has a higher demand for system resources, especially when processing large documents. Later, Xpath and Xpointer emerged, mainly for XML search and conversion; XSL, XSLT, and SOAP were developed, mainly for XML-remote object access; with the emergence of XMLQuery Languages, XML query languages can be used for any XML document.

Following the development of networks and Internet, data portability has become an important requirement for new application systems. A benefit of XML is data portability; in addition, XML has the following advantages from a data application aspect: (1) XML files are plain text files, which are not limited by operating systems and software platforms; (2) XML has a Schema-based self-descriptive semantics function, with which the data semantics can be described easily, and such description can be interpreted and automatically processed by computers; (3) XML not only can describe structured data, but also can describe semi-structured or even unstructured data effectively.

An XML file is a collection of data, and it is self-descriptive and portable, and can describe data in tree structures or graphic structures. XML provides many tools available in databases: storage (XML document), schema (DTD, XML schema, REIAXNG, etc.), query language (XQuery, XPath, XQL, XML-QL, QUILT, etc.), and programming interface (SAX, DOM, JDOM), etc. However, XML can not substitute for database technology completely. XML lacks features that must be available in practical databases: efficient storage, indexing, and data modification mechanism; rigorous data security control; complete transaction and data consistency control; multi-user access mechanism; trigger and sophisticated concurrency control, etc. Therefore, XML has poor data reading performance, and this disadvantage will become more apparent when the same XML document is to be read several times. Though XML documents can be used as a database in the environments where the data volume is low, the number of users is small, and the requirement for performance is not high, XML documents are not suitable for working environments where the number of users is large, the data integration level is high, and the requirement for performance is high.

SUMMARY OF THE INVENTION

To overcome the drawbacks in the prior art, the present invention provides a method for storing XML data into a relational database, which can be used to store XML data into a relational database, so as to speed up data reading and access.

To attain the object described above, the method for storing XML data into a relational database provided in the present invention comprises the following steps:

splitting an XML Schema into one or more mapping configuration files, each of which corresponds to a relational database table;

phrasing the XML text, and inserting the data in the XML text into multiple relational database tables according to the associative relationship in the mapping configuration files;

reading the data in the XML document by accessing the database.

The mapping configuration file consists of a root node and a plurality of child nodes, wherein, the attributes of the root node include: Name, Initial Depth, and Depth Number; the attributes of the child node include: ID, Parent ID, Name, Depth Number, Maximum Value, and Type.

The Name of the root node is a non-null string, and is designed to specify the name of a database table;

the Initial Depth of the root node is a positive integer, and the mapping file will be used when the parsing depth of the XML tree is equal to the value;

the Depth Number of the root node is a positive integer, and the mapping file will not be used any more when the XML tree is parsed from the Initial Depth to the value;

the ID of the child node is a positive integer, and represents the ID of the node; the Parent ID of the child node is a positive integer, and represents the ID of the parent node of the current node; this field will be 0 if the current node has no parent node;

the Name of the child node is a non-null string, and represents the name of a tag;

the Depth Number of the child node is a positive integer, wherein, in relation to the depth number of Initial Depth, an attempt for matching the current node will be made, when the parsed Depth Number of XML is equal to the value;

the Maximum Value of the child node is a positive integer, and the tag that has the name of the child node will be expanded into a plurality fields of one record within the range of the Maximum Value;

the Type of the child node is a string, and indicates whether the child node is a primary key, the basic data type, and whether the child node is a leaf node.

Identical nodes can appear in different mapping files; indexes are created in different mapping files according to the node of Primary Key type.

The XML text parsing step further comprises the following steps:

judging whether to enter into the current node according to an index file;

judging whether the current node is a leaf node that does not contain any other child node, according to the index file;

judging whether a record has been accomplished according to the index file.

With the method provided in the present invention, an XML Schema is split into one or more mapping configuration files, according to the XML Schema and the user's requirement, etc., wherein, each mapping configuration file corresponds to a relational database table. When XML text is parsed and read for the first time, the data in the XML text is inserted into multiple relational database tables, according to the associative relationships in the mapping files; thus, the object of storing XML data into a relational database is attained, and the data reading and access can be sped up.

Hereunder other characteristics and advantages of the present invention will be described, and will become apparent partially from the description or can be understood clearly from the description of some embodiments.

DESCRIPTION OF THE DRAWINGS

The accompanying drawings are provided to help further understanding of the present invention, and constitute a part of the description. These drawings are used in conjunction with the description and embodiments to interpret the present invention, but do not constitute any limitation to the present invention. Among the drawings.

DETAILED DESCRIPTION OF THE EMBODIMENTS

Hereunder some embodiments of the present invention will be described, with reference to the accompanying drawings. It should be appreciated that the embodiments described here are only provided to describe and interpret the present invention, but do not constitute any limitation to the present invention.

An XML file has a tree structure, which is consisted of tags and payload. Structured data can be stored in an XML plain text file. An application program can read XML data by parsing the XML tags. Compared to relational databases in which the data to be read/written can be located quickly according to data indexes, XML has poor data reading performance, and this disadvantage will be more apparent if the same XML text is to be read several times. In such cases, the XML data can be stored into a relational database, so as to speed up data reading and access. However, the tree-structured data in XML must be mapped into data in a two-dimensional structure in a relational database, owing to the fact that the data structure in a relational database is a two-dimensional structure, while XML text has a tree structure.

Figure 1:
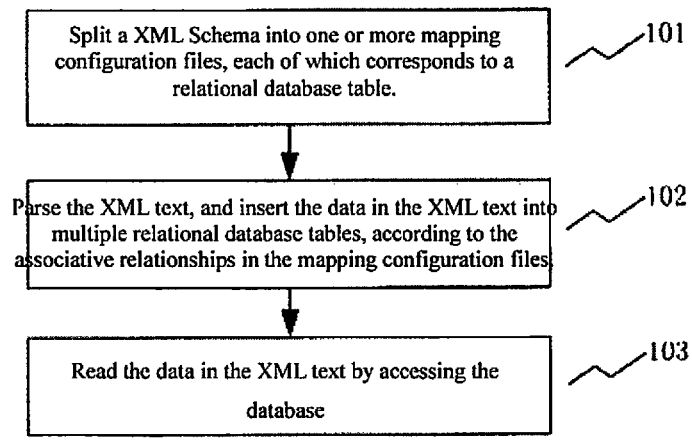
FIG. 1 is a flow chart of the method for storing XML data into a relational database according to an embodiment of the present invention.

FIG. 1 is a flow chart of the method for storing XML data into a relational database according to the present invention. Hereunder the method for storing XML file data into a relational database provided in the present invention will be detail described, with reference to FIG. 1.

First, in step 101, an XML Schema is split into one or more mapping configuration files, according to the XML Schema and the user's requirement, etc., wherein, each mapping configuration file corresponds to a relational database table.

The structure of a mapping configuration file comprises a root node and a plurality of child nodes, wherein, the attributes of the root node include: Name, Initial Depth, and Depth Number, etc.; the attributes of the child node include: ID, Parent ID, Name, Depth Number, Maximum Value, and Type, etc. They are detailed as follows:

| Node Type | Field Name | Value Range | Description |
| --- | --- | --- | --- |
| Root node | Name | Non-null string | Represents the name of a database table. |
| | Initial Depth | Positive integer | The mapping configuration file will be used when the parsing depth of the XML tree is equal to the value. |
| | Depth Number | Positive integer | The mapping configuration file will not be used any more when the XML tree is parsed from Initial Depth to the value. |
| Child node | ID | Positive integer | ID of the node |
| | Parent ID | Positive integer | ID of the parent node of the current node; this field will be 0 if the current node has no parent node. |
| | Name | Non-null string | Name of tag |
| | Depth Number | Positive integer | In relation to the depth number of Initial Depth, an attempt for matching the current node will be made, when the parsed Depth Number of XML is |

| Node Type | Field Name | Value Range | Description |
|---|---|---|---|
| | Maximum Value | Positive integer | equal to the value. The tag with the name of the child node will be expanded into a plurality of fields of a record with the range of the Maximum Value. |
| | Type | String | whether the current node is a primary key, the basic data type, and whether the current node is a leaf node, etc. |

Identical nodes could appear in different mapping configuration files; indexes are created in different mapping configuration files according to the node of Primary Key type.

In step 102, when the XML text is parsed for the first time, insert the data in the XML text into multiple relational database tables, according to the associative relationships in the mapping configuration files. The parsing of XML text is a XML data tree parsing process, wherein, the XML data tree is parsed sequentially for the entry/exit of each tag and the content contained in each tag, and the XML data is stored into the relational database. The XML text parsing rules are as follows:

a) Tag entry processing: judge whether to enter into the tag according to an index file. Save all attributes, and log the tag entry flag. Stop the parsing if the depth has exceeded the tree depth specified in the index file;

b) Tag content processing: save the tag content, if the current node is a leaf node that does not contain any other child node;

c) Tag exit processing: judge whether a record has been completed according to the index file, and save the data into the database.

In step 103, XML file data is stored into the relational database, and read the data in the XML by accessing the database.

Figure 2:
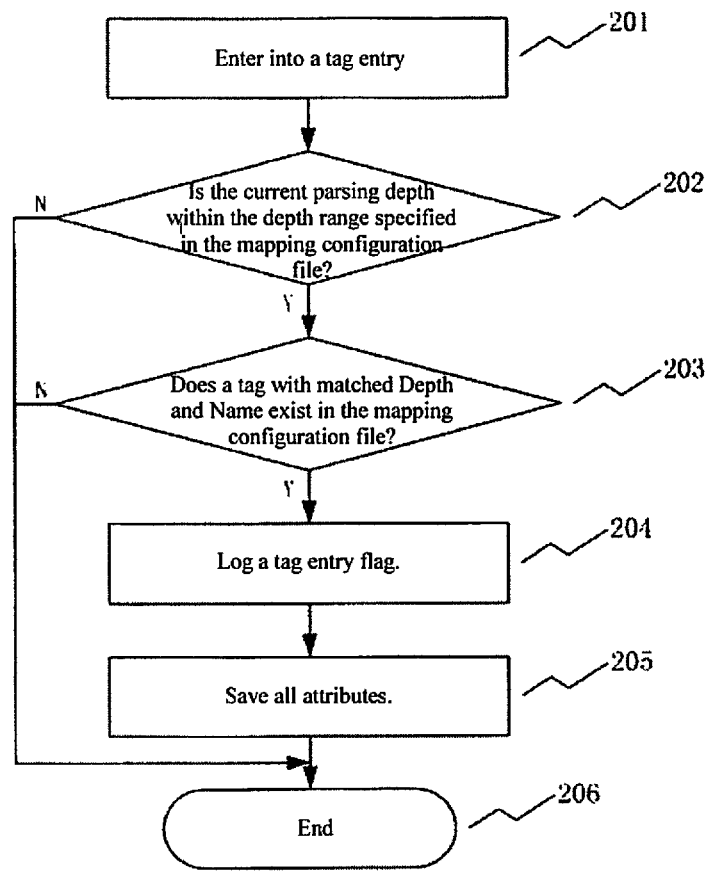
FIG. 2 is a flow chart of tag entry processing according to an embodiment of the present invention.

FIG. 2 is a flow chart of tag entry processing according to the present invention. Hereunder the tag entry processing will be detailed, with reference to FIG. 2:

First, in step 201, enter into the entry of the tag;

In step 202, judge whether the current parsing depth is within the depth range specified in the mapping configuration file; proceed to the next step if the parsing depth is within the depth range specified in the mapping configuration file; otherwise go to step 206 to exit from tag entry processing;

In step 203, judge whether there is any tag that has matched Depth and Name in the mapping configuration file; proceed to the next step if a tag that has matched Depth and Name is found in the mapping configuration file; otherwise go to step 206 to exit the tag entry processing;

In step 204, log the tag entry flag;

In step 205, save all attributes of the tag;

In step 206, finish and exit from the tag entry processing.

Figure 3:
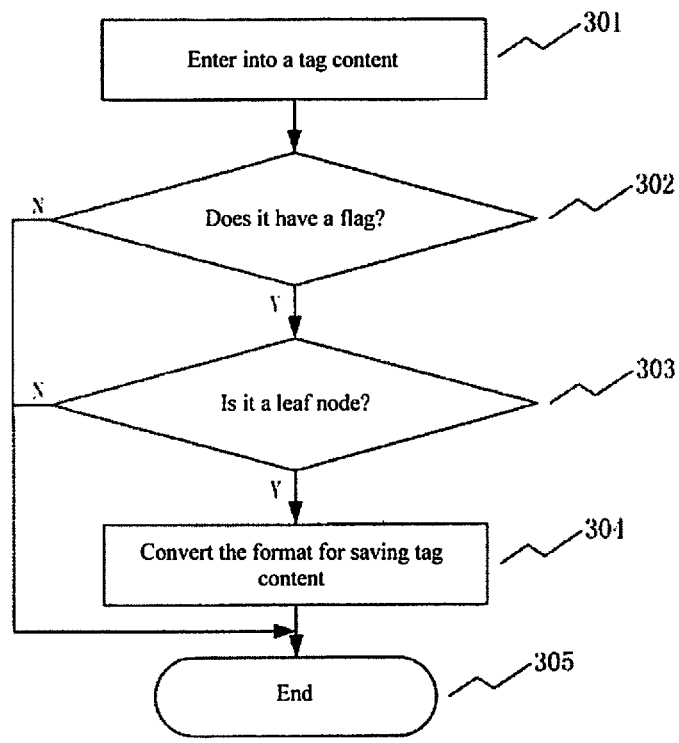
FIG. 3 is a flow chart of tag content processing according to an embodiment of the present invention.

FIG. 3 is a flow chart of tag content processing according to the present invention. Hereunder the tag content processing will be detail described with reference to FIG. 3:

First, in step 301, enter into the content of the tag;

In step 302, judge whether the tag has a tag flag; proceed to the next step if the tag has a tag flag; otherwise go to step 305 to end the tag content processing;

In step 303, judge whether the current node is a leaf node; proceed to the next step if the current node is a leaf node; otherwise go to step 305 to end the tag content processing;

In step 304, convert the format for saving tag content;

In step 305, finish the tag content processing.

Figure 4:
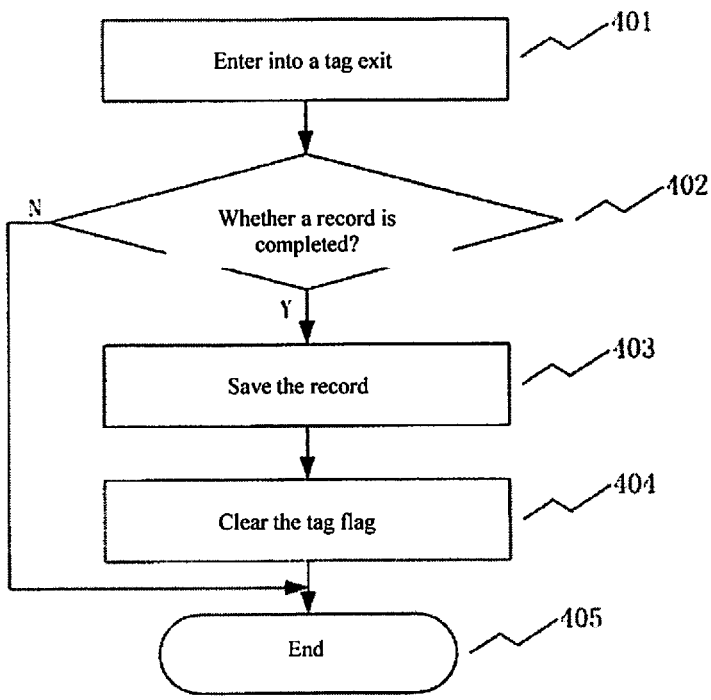
FIG. 4 is a flow chart of tag exit processing according to an embodiment of the present invention.

FIG. 4 is a flow chart of tag exit processing according to the present invention. Hereunder the tag exit processing will be detailed, with reference to FIG. 4:

First, in step 401, enter into the exit of the tag;

In step 402, judge whether a record has been completed according to the index file; proceed to the next step if a record has been completed; otherwise go to step 405 to end the tag exit processing;

In step 403, save the completed record;

In step 404, clear the tag flag;

In step 405, finish the tag exit processing.

With the method for storing XML file data into a relational database provided in the present invention, when an XML file is accessed, the XML file has to be parsed only once; all subsequent reading operations can be accomplished by accessing a database; thus, the data reading is faster than reading directly from the XML file.

Those skilled in the art should appreciate: the embodiments described above are only some preferred embodiments of the present invention, and should not be deemed as constituting any limitation to the present invention. Though the present invention is described and illustrated in detail with reference to the embodiments, the present invention is not limited to these embodiments. Those skilled in the art can easily make modifications to the technical schemes described above in the embodiments or make equivalent replacement of some technical features. However, any modification, equivalent replacement, or refinement to the embodiments without departing from the spirit and principle of the present invention shall be deemed as falling into the protection scope of the present invention.

The invention claimed is:

1. A method for storing Extensible Markup Language (XML) data into a relational database, comprising:

splitting an XML Schema into one or more mapping configuration files, each of which corresponds to a relational database table, the one or more mapping configuration files each including of one root node and a plurality of child nodes, wherein XML attributes of the root node include Name, Initial Depth, and Depth Number, and XML attributes of the child nodes include identification (ID), Parent identification (Parent ID), Name, Depth Number, Maximum Value, and Type;

parsing XML text from the one or more mapping configuration files, and inserting data from the XML text into multiple relational database tables according to associative relationships in the one or more mapping configuration files, wherein parsing XML text from the one or more mapping configuration files includes:

judging whether to enter into a node of the XML text, according to an index file, by judging that a current parsing depth of the XML text is within a depth range attribute specified in the index file, and judging that a tag with a Depth Number attribute and a Name attribute exists in the mapping configuration file that matches the index file, and otherwise stopping the parsing, the parsing XML;

judging whether the node is a leaf node that does not contain a child node, according to the index file, and judging whether a record has been completed, according to the index file;

logging, in the index file, a tag entry flag, and saving all attributes of the tag, and logging a tag with a Depth Number attribute and a Name attribute found in the XML text; and reading the data from the XML text by accessing the multiple relational database tables;

wherein the Name attribute of the root node of each of the one or more mapping configuration files is a non-null string, and specifies a name of a database table;

the Initial Depth attribute of the root node of each of the one or more mapping configuration files is a positive integer, and the one or more mapping configuration files are used when a parsing depth of the XML text is equal to the positive integer of the Initial Depth attribute of the root node;

the Depth Number attribute of the root node of each of the one or more mapping configuration files is a positive integer, and the one or more mapping configuration files are not used any more when the XML text is parsed from the Initial Depth attribute to the positive integer of the Depth Number attribute of the root node;

the ID attribute of the child nodes are positive integers, and represent node identifications for the child nodes;

the Parent ID attribute of the child nodes are integers, and represent identifications for parent nodes for one or more of the child nodes wherein the integer of the Parent ID is zero for each child node of the plurality of child nodes that has no parent node;

the Name attribute of the child nodes are non-null strings, and represent names of one or more tags;

the Depth Number attribute of the child nodes are positive integers;

the Maximum Value attribute of the child nodes are positive integers; and the Type attribute of the child nodes are strings, and indicate whether the child nodes are primary key, indicate a basic data type for the child nodes, and indicate whether the child nodes are a leaf node, wherein indexes are created in different mapping configuration files according to a node of Primary Key type.

2. The method for storing XML data into a relational database according to claim 1, wherein, identical nodes can appear in different mapping configuration files.

3. The method for storing XML data into a relational database according to claim 1, wherein, judging whether the node is a leaf node that does not contain a child node according to the index file further comprises:

judging whether a tag of the node has a tag flag; and converting a format for storing a tag content if the tag has a flag and the node is a leaf node; and otherwise stopping the parsing.

4. The method for storing XML data into a relational database according to claim 3, wherein, judging whether a record has been completed according to the index file further comprises:

saving the completed record and clearing the tag flag if the record has been completed; and otherwise stopping the parsing.

* * * * *